US009335974B2

(12) United States Patent
Howard

(10) Patent No.: US 9,335,974 B2
(45) Date of Patent: May 10, 2016

(54) SYSTEM AND METHOD FOR DETERMINING AND DISPLAYING DESIGN COMPLEXITY OF A SOFTWARE DESIGN

(71) Applicant: Massively Parallel Technologies, Inc., Boulder, CO (US)

(72) Inventor: Kevin D. Howard, Tempe, AZ (US)

(73) Assignee: Massively Parallel Technologies, Inc., Boulder, CO (US)

( * ) Notice: Subject to any disclaimer, the term of this patent is extended or adjusted under 35 U.S.C. 154(b) by 0 days.

(21) Appl. No.: 14/253,397

(22) Filed: Apr. 15, 2014

(65) Prior Publication Data

US 2014/0310684 A1    Oct. 16, 2014

Related U.S. Application Data

(66) Substitute for application No. 61/812,186, filed on Apr. 15, 2013.

(51) Int. Cl.
*G06F 9/44*    (2006.01)

(52) U.S. Cl.
CPC .......................................... *G06F 8/20* (2013.01)

(58) Field of Classification Search
None
See application file for complete search history.

(56) References Cited

U.S. PATENT DOCUMENTS

| 6,289,502 | B1 * | 9/2001 | Garland et al. | 717/104 |
|---|---|---|---|---|
| 6,301,686 | B1 * | 10/2001 | Kikuchi et al. | 716/122 |
| 6,317,864 | B1 * | 11/2001 | Kikuchi et al. | 716/122 |
| 6,370,681 | B1 * | 4/2002 | Dellarocas et al. | 717/110 |
| 6,385,758 | B1 * | 5/2002 | Kikuchi et al. | 716/122 |
| 7,343,594 | B1 * | 3/2008 | Metzgen | 717/140 |
| 7,788,646 | B2 * | 8/2010 | Ward | 717/132 |
| 8,959,494 | B2 * | 2/2015 | Howard | 717/144 |
| 2002/0170042 | A1 * | 11/2002 | Do et al. | 717/143 |
| 2004/0088677 | A1 * | 5/2004 | Williams | 717/104 |
| 2004/0117749 | A1 * | 6/2004 | Lalonde et al. | 716/11 |
| 2006/0064178 | A1 * | 3/2006 | Butterfield | G06F 8/20 700/18 |
| 2007/0130561 | A1 * | 6/2007 | Siddaramappa et al. | 717/106 |
| 2008/0235655 | A1 * | 9/2008 | Defour et al. | 717/104 |
| 2009/0235226 | A1 * | 9/2009 | Murthy et al. | 717/104 |
| 2010/0023914 | A1 * | 1/2010 | Sahouria et al. | 716/19 |
| 2013/0254743 | A1 * | 9/2013 | Howard | 717/123 |
| 2013/0254751 | A1 * | 9/2013 | Howard | 717/136 |

* cited by examiner

*Primary Examiner* — Isaac T Tecklu
(74) *Attorney, Agent, or Firm* — Lathrop & Gage LLP

(57) ABSTRACT

A system, method and software product determine and display a complexity designation of a software design based upon a hierarchical functional decomposition design model. Within a development server, a number of decomposition levels in the software design, a number of subgraphs in the software design, and a number of processes in the software design are determined. A complexity designation for the software design based upon the number of decomposition levels and the average number of processes in the subgraphs is then determined and displayed.

20 Claims, 9 Drawing Sheets

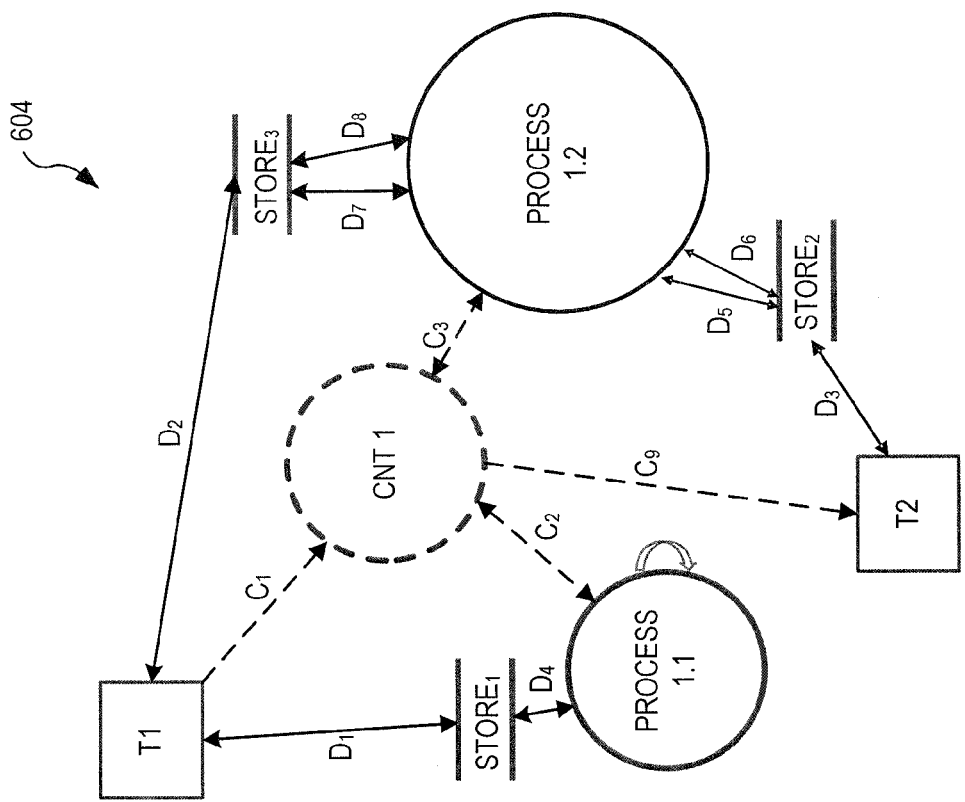
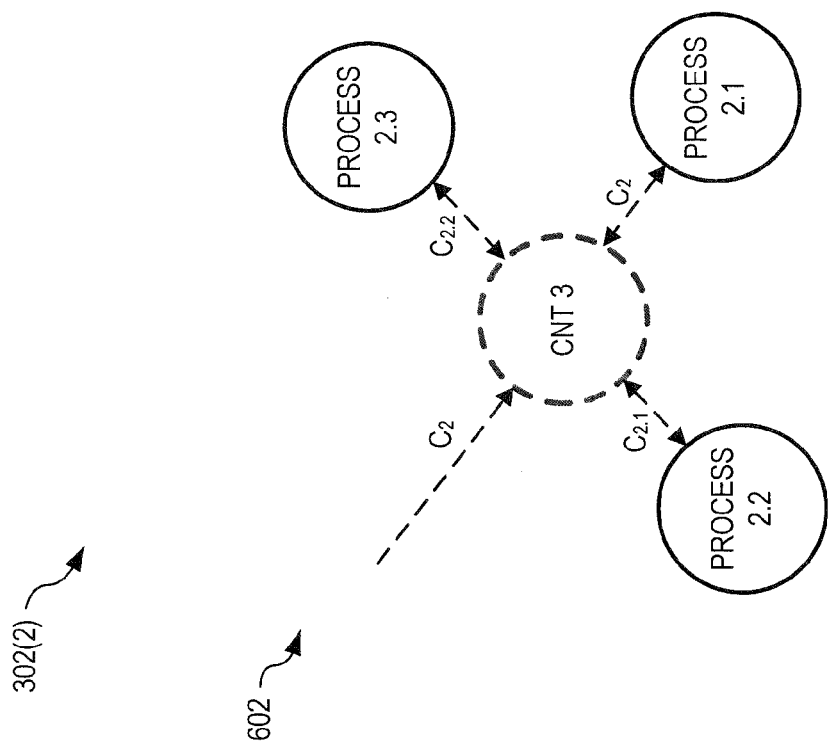
FIG. 6

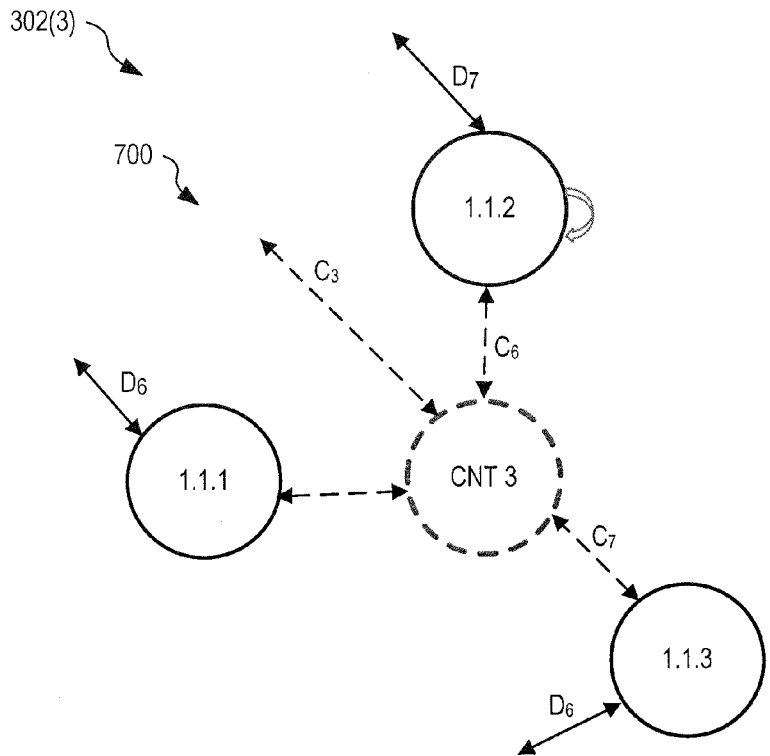

Decomposition Levels = 10
    Level 0 = $10^0$ process    =    1    process    = 1 graph
    Level 1 = $10^1$ processes    =    10    processes = $10^0$ subgraph =    1 subgraph
    Level 2 = $10^2$ processes    =    100    processes = $10^1$ subgraphs =    10 subgraphs
    Level 3 = $10^3$ processes    =    1000    processes = $10^2$ subgraphs =    100 subgraphs
    Level 4 = $10^4$ processes    =    10000    processes = $10^3$ subgraphs =    1000 subgraphs
    Level 5 = $10^5$ processes    =    100000    processes = $10^4$ subgraphs =    10000 subgraphs
    Level 6 = $10^6$ processes    =    1000000    processes = $10^5$ subgraphs =    100000 subgraphs
    Level 7 = $10^7$ processes    =    10000000    processes = $10^6$ subgraphs =    1000000 subgraphs
    Level 8 = $10^8$ processes    =    100000000    processes = $10^7$ subgraphs =    10000000 subgraphs
    Level 9 = $10^9$ processes    = 1000000000    processes = $10^8$ subgraphs = 100000000 subgraphs 1,111,111,111 processes    on    111,111,111 subgraphs

FIG. 8

Decomposition Levels = 2
Level 0 = $2^0$ process  = 1 process  = 1 graph
Level 1 = $2^1$ process  = 2 processes = 1 subgraph
Level 2 = $2^2$ process  = 4 processes = 2 subgraphs 7 processes = 1 graph + 3 subgraphs

SYSTEM AND METHOD FOR DETERMINING AND DISPLAYING DESIGN COMPLEXITY OF A SOFTWARE DESIGN

RELATED APPLICATIONS

This application claims priority to U.S. Patent Application Ser. No. 61/812,186, titled "System and Method for Determining and Displaying Design Complexity of a Software Design," filed Apr. 15, 2013, and incorporated herein by reference.

BACKGROUND

Generally speaking Occam's razor applies to software. That is, the simplest software which solves a given problem is usually the better software. This is because simpler software is easier to maintain, easier to use, and easier to extend. Cyclomatic Complexity indicates the complexity of a software program by directly measuring the number of linearly independent paths through a program's source code. Thomas J. McCabe, Sr., in his work on Cyclomatic Complexity (McCabe T., A Complexity Measure, IEEE Transactions on Software Engineering, December 1976, incorporated herein by reference), showed that a code snippet with greater than ten separate linear independent paths is very difficult to maintain, or change.

SUMMARY OF THE INVENTION

A massively parallel processing environment uses a type of functional decomposition design model that is equivalent to the type of hierarchical finite state machine (FSM) described by Grady Booch, Ivar Jacobson, and James Rumbaugh in their document UML Distilled—Applying the Standard Object Modeling Language. The massively parallel processing environment also uses design processes and data-stores defined in U.S. patent application Ser. No. 13/490,345, titled "Method For Automatic Extraction of Designs From Standard Source Code," filed Jun. 6, 2012, and which is incorporated herein by reference. This design model may include hierarchical and non-hierarchical processes. Each hierarchical process decomposes into a "sub-design graph" (hereinafter a "subgraph"), which is equivalent to the code snippet discussed by McCabe. Each process may be considered equivalent to a McCabe linear independent path. Thus, McCabe's maximum complexity metric may be extended to apply to processes of subgraphs. Because of the hierarchical nature of the functional decomposition design model, the design complexity may be shifted to different levels of decomposition; thus, the measure of complexity may be extended to use the number of decomposition levels as well as to the number of processes on a subgraph. A three-dimensional complexity model is used in the following examples to fully describe the complexity of a design, and how McCabe's concept of complexity is extended to measure complexity of a functional decomposition design.

In one embodiment, a method determines and displays a complexity designation of a software design based upon a hierarchical functional decomposition design model. Within a development server, a number of decomposition levels in the software design, a number of subgraphs in the software design, and a number of processes in the software design are determined. A complexity designation for the software design based upon the number of decomposition levels and the average number of processes in the subgraphs is then determined.

In another embodiment, a software product has instructions, stored on non-transitory computer-readable media, wherein the instructions, when executed by a computer, perform steps for determining and displaying a complexity designation of a software design based upon a hierarchical functional decomposition design model. The software product includes: instructions for determining, within a development server, a number of decomposition levels in the software design; instructions for determining a number of subgraphs in the software design; instructions for determining a number of processes in the software design; and instructions for determining a complexity designation for the software design based upon the number of decomposition levels and the average number of processes in the subgraphs.

In another embodiment, a system determines and displays design complexity of a software design. The system includes a development server that has a processor and a memory, wherein the memory stores machine readable instructions that when executed by the processor perform the steps of: determining, within a development server, a number of decomposition levels in the software design; determining a number of subgraphs in the software design; determining a number of processes in the software design; and determining a complexity designation for the software design based upon the number of decomposition levels and the average number of processes in the subgraphs.

BRIEF DESCRIPTION OF THE FIGURES

FIGS. 4-7 show exemplary decomposition of the graph of FIG. 3 into a context level and three decomposition levels of subgraph.

FIG. 8 shows the maximum maintainable number of processes for a single software design.

DETAILED DESCRIPTION OF THE EMBODIMENTS

Three Dimensional Design Complexity Metric

Figure 1:
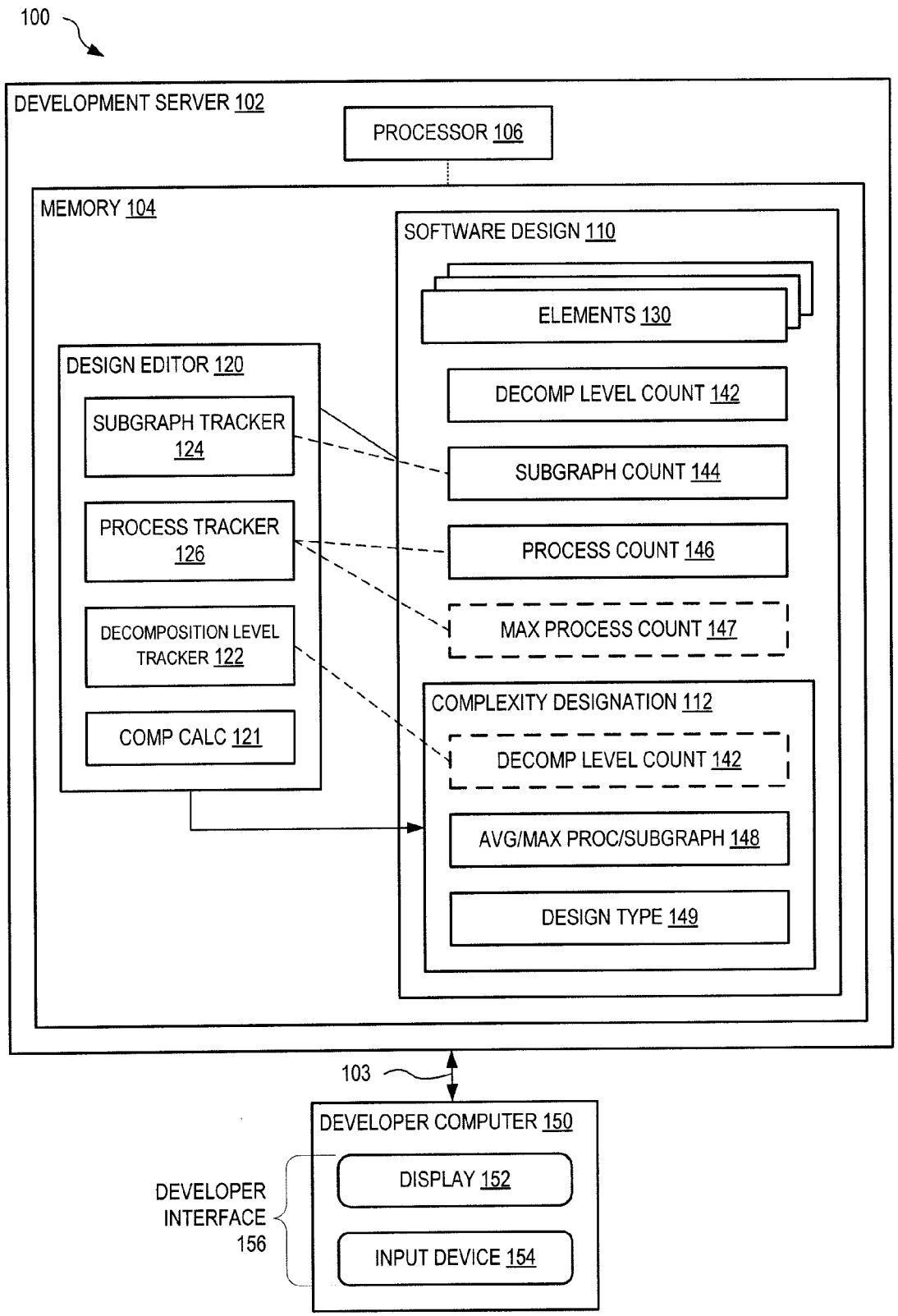
FIG. 1 shows one exemplary system for determining and displaying design complexity of a software design, in an embodiment.

FIG. 1 shows one exemplary system 100 for determining and displaying a complexity designation 112 for a software design 110. Software design 110 is a hierarchical functional decomposition design model that includes a plurality of design elements 130 that have defined hierarchical relationships. System 100 includes a development server 102 that is for example implemented within the cloud and accessible via a computer network 103 that represents the Internet and/or other such computer networks. Server 102 includes a processor 106 and a memory 104 for storing software design 110. Memory 104 stores software design 110 and a design editor 120 that includes a plurality of machine readable instructions that when executed by processor 106 interact with a developer computer 150 to create and edit software design 110, as described in detail below.

Developer computer 150 has a developer interface 156 that includes a display 152 and an input device 154. Developer interface 156 may represent a browser that connects via network 103 to allow a developer, using design editor 120, to create, edit, and test software design 110.

Design editor 120 includes a complexity calculator 121 that determines complexity designation 112 of software design 110. As noted above, McCabe teaches that Cyclomatic Complexity indicates the complexity of a software program by directly measuring the number of linearly independent paths through a program's source code. However, McCabe fails to take into account the hierarchical functional decomposition used within software design 110, and therefore cannot be directly applied to software design 110. Complexity calculator 121 extends the teachings of McCabe to include hierarchical functional decomposition to determine complexity designation 112 of software design 110 that indicates complexity and maintainability.

Design editor 120 includes a decomposition level tracker 122, a subgraph tracker 124, and a process tracker 126, that are software modules that operate within design editor 120 to track the number of decomposition levels within software design 110 as decomposition level count 142, the number of subgraphs within each decomposition level as subgraph count 144, and the number of processes within each subgraph as process count 146 and optionally maximum number of processes within any one subgraph as max process count 147, respectively, during creation and editing of software design 110. Based upon decomposition level count 142, subgraph count 144, and process count 146 and optionally max process count 147, complexity calculator 121 determines and displays complexity designation 112. Optionally, complexity designation 112 is stored within, or in association with, software design 110 such that complexity designation 112 may be viewed at any time.

Complexity designation 112 includes decomposition level count 142, process per subgraph count 148, and a design type 149. Design type 149 is one of unmaintainable, compact, loose, and balanced. An unmaintainable design is a design with McCabe-like complexity violations in one or more design dimensions. A compact design is a design without McCabe-like violations where the number of decomposition levels is less than the average number of processes per subgraph, excluding the average number of processes per subgraph in the lowest decomposition level. A loose design is a design without McCabe-like violations where the number of decomposition levels is greater than the average number of processes per subgraph, excluding the average number of processes per subgraph in the lowest decomposition level. A balanced design is a design where there are no McCabe-like violations and where the number of decomposition levels is equal to the average number of processes per subgraph, excluding the average number of processes per subgraph in the lowest decomposition level.

Figure 2:
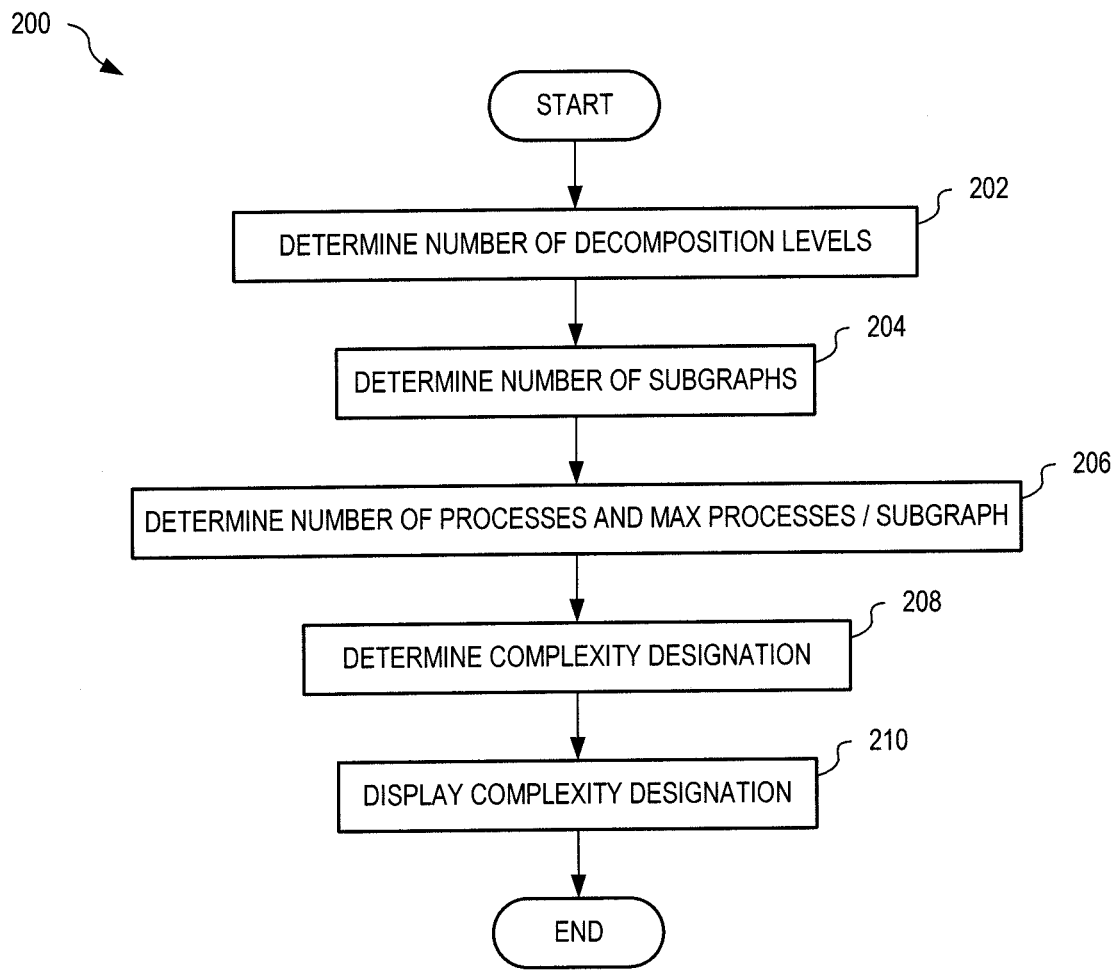
FIG. 2 is a flowchart illustrating on exemplary method for determining and displaying design complexity of a software design, in an embodiment.

FIG. 2 is a flowchart illustrating on exemplary method 200 for determining and displaying design complexity of a software design. Method 200 is for example implemented within design editor 120 and complexity calculator 121 of FIG. 1. FIGS. 1 and 2 are best viewed together with the following description.

In step 202, method 200 determines a number of decomposition levels. In one example of step 202, decomposition level tracker 122 tracks decomposition levels during development of software design 110 and stores the number of decomposition levels as decomposition level count 142 within memory 104.

In step 204, method 200 determines a number of subgraphs within software design 110. In one example of step 204, subgraph tracker 124 tracks the number of subgraphs within each decomposition level of software design 110 and stores the value as subgraph count 144.

In step 206, method 200 determines a number of processes and max processes per subgraph. In one example of step 206, process tracker 126 maintains process count 146 of the number of processes defined within software design 110, and a max process count 147 of the maximum number of processes within any one subgraph of software design 110.

In step 208, method 200 determines a complexity designation. In one example of step 208, complexity calculator 121 divides process count 146 by subgraph count 144 to determine an average number of processes per subgraph 148. Complexity calculator 121 then determines a design type 149 based upon decomposition level count 142 and processes per subgraph 148, as described below in further detail, where design type 149 is one of unmaintainable, compact, loose, and balanced. In an alternate embodiment, complexity calculator 121 sets processes per subgraph 148 equal to max processes 147, thereby indicating a "worst case" complexity within software design 110.

In step 210, method 200 displays complexity designation 112. In one example of step 210, design editor 120, and other modules within development server 102, displays complexity designation 112 in association with software design 110 as shown and described hereinafter.

In the embodiment of FIG. 1, decomposition level count 142, subgraph count 144, process count 146, and max process count 147, and complexity designation 112 are stored within software design 110 and automatically calculated as software design 110 is created and/or amended. In an alternative embodiment, complexity calculator 121, periodically and/or on demand, scans through hierarchical levels of software design 110 to count decomposition levels, subgraphs, and processes to generate decomposition level count 142, subgraph count 144, process count 146 and optionally max process count 147.

Figure 3:
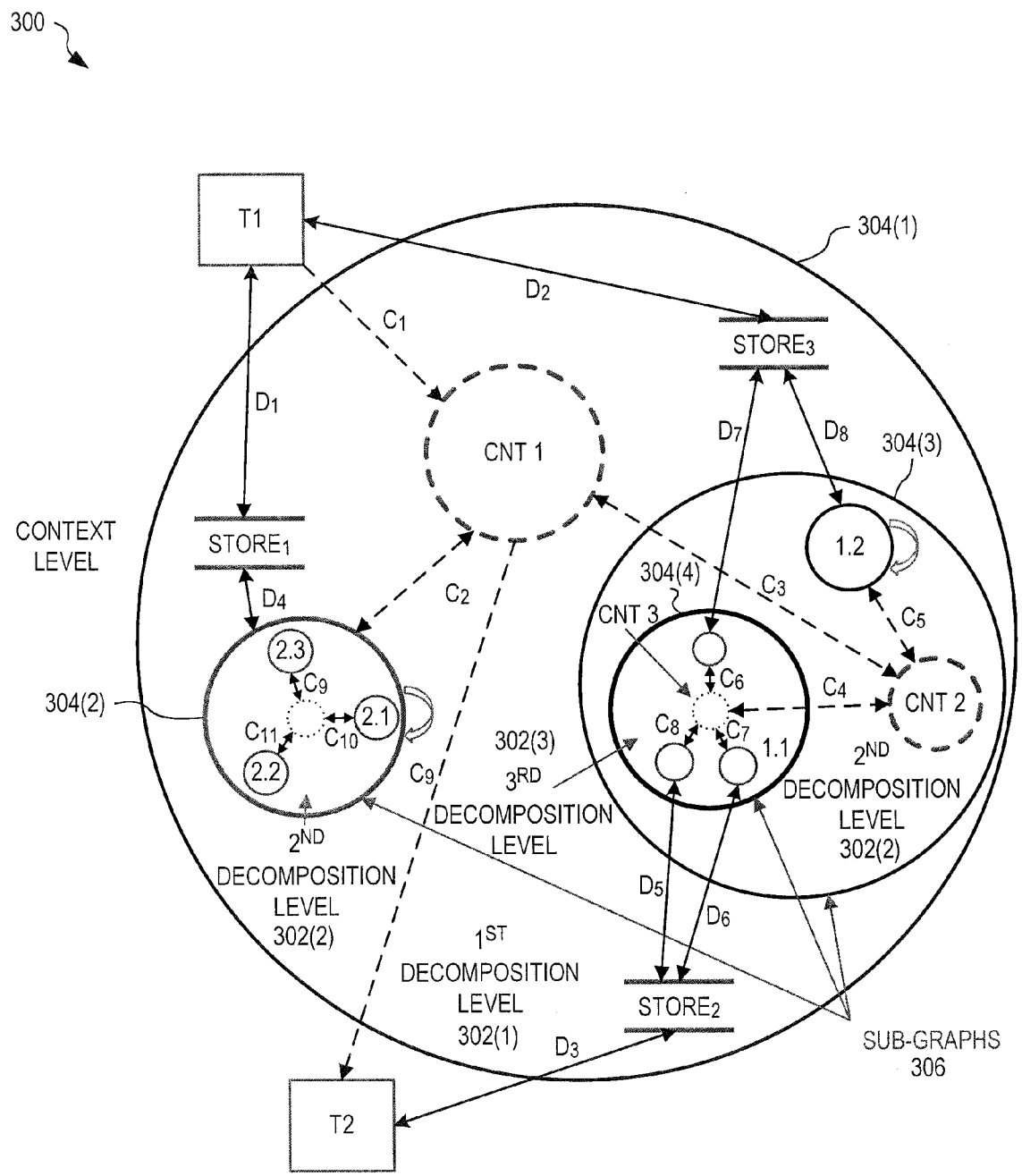
FIG. 3 shows one exemplary hierarchical software decomposition graph illustrating three decomposition levels of a software design.

FIG. 3 shows one exemplary hierarchical software decomposition graph 300 illustrating three decomposition levels 302 of software design 110. A process 304(1) is at a 1st decomposition level 302(1), processes 304(2) and 304(3) are at a 2nd decomposition level 302(2), and a process 304(4) is at a 3rd decomposition level 302(3). Each decomposition level 302 contains one subgraph 306 per decomposing process 304. Each subgraph 306 may be considered analogous to a code snippet of McCabe. Note that a process that decomposes into a single lower level process is invalid as no additional graph information is added. So, a process may be decomposed into a subgraph with a minimum of two processes on it.

Figure 4:
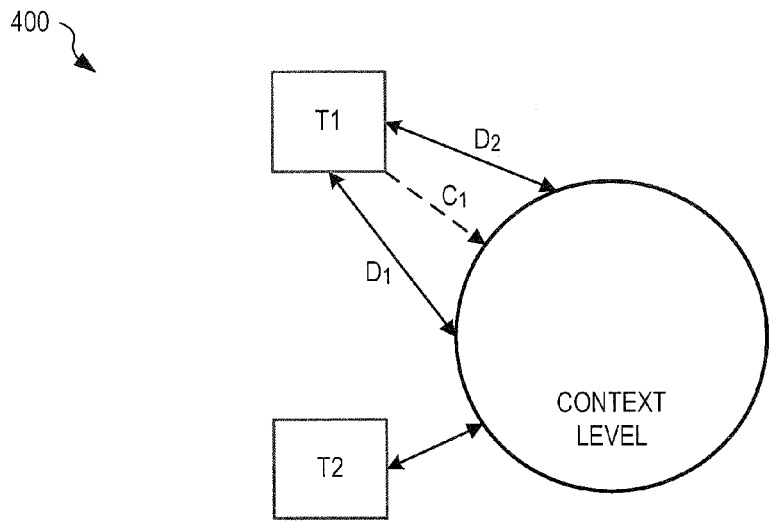
Figure 5:
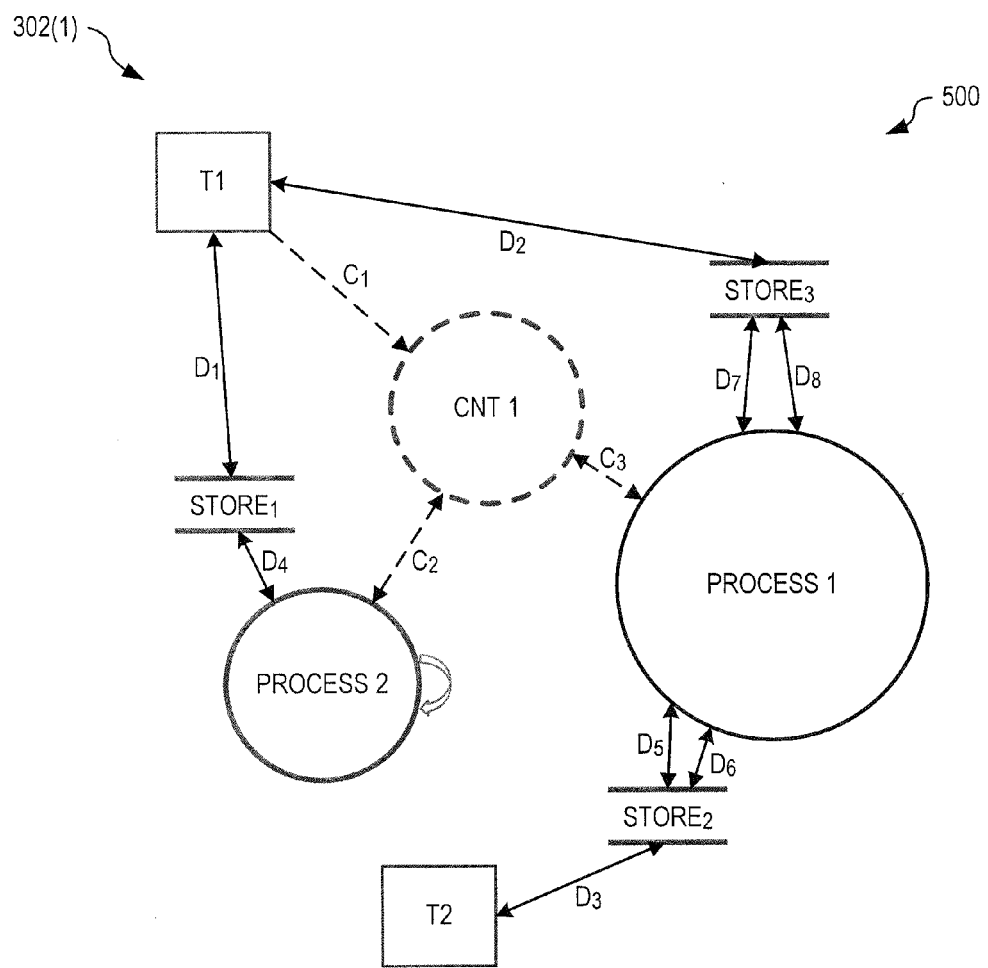

Hierarchical software decomposition graph 300 may be re-drawn as a context level 400, shown in FIG. 4, and three decomposition levels 302(1), 302(2), and 302(3), as shown in FIGS. 5-7, respectively. Decomposition level 302(1) is drawn as subgraph 500, decomposition level 302(2) is drawn as subgraphs 600 and 602, and decomposition level 302(3) is drawn as subgraph 700. Notice that the context level 400 has only a single process, because it represents the entire software design. Notice that the 2nd decomposition level shown in FIG. 6 contains two subgraphs 600 and 602 of lower-level processes. Process 1 of subgraph 500 decomposes to subgraph 602 with two processes, and process 2 of subgraph 500 decomposes to subgraph 600 with three processes.

Redrawing of graph 300 as context level 400, and subgraphs 500, 600, 602, and 700 hides the overall complexity of the software while retaining McCabe's code snippet concept.

In the subgraphs of FIGS. 3-7, solid circles represent processes and the dashed circles represent control processes. This model ensures that there is only a single control process per subgraph. Only the processes, not the control processes, count as linear independent paths in the McCabe sense.

Given that a process is equivalent to a McCabe linear independent path, each time a process is decomposed into a subgraph, the complexity of that subgraph is the number of processes on that subgraph. This means that the general McCabe complexity model may be expanded from code snippets to decomposable design processes. The number of decomposition levels represents another dimension of complexity. McCabe's Cyclomatic Complexity model captures the complexity of each subgraph but not the number of decomposition levels or the total number of subgraphs for a particular decomposition level. It is clear from FIGS. 3 through 7 that the complexity of the software may be distributed across three dimensions rather than the single dimension used by McCabe: the number of decomposition levels, and the number of subgraphs per decomposition level, and the number of processes per subgraph. If McCabe's maximum maintainable complexity number of "10" is applied to two of the three dimensions of a functional decomposition model—the number of levels of decomposition as well as the number of processes per subgraph; then FIG. 8 shows the maximum maintainable number of processes for a single software design. The number of subgraphs per decomposition level is determined by the number of hierarchical processes at the prior level.

The number of processes (1,111,111,111) for a software application is a large but finite number. Over a billion processes may be used in a single software application while still being maintainable and usable. However, it is clear that this number could only be reached if there are no McCabe-like violations at any of the design levels. These ideas produce four different design types: Unmaintainable Design, Compact Design, Loose Design, and Balanced Design.

Unmaintainable Designs

There are two ways to generate an unmaintainable design: the number of decomposition levels exceeds 10 or the number of processes on any subgraph exceeds 10. Unmaintainable designs are also difficult to use for the same reason they are difficult to maintain: humans generally have a short-term memory of 7 plus or minus 2 items. Thus, having any part of a design greater than the ability of a person to retain that part of the design in short-term memory makes it difficult to either use or manipulate that part of the design.

Figure 9:
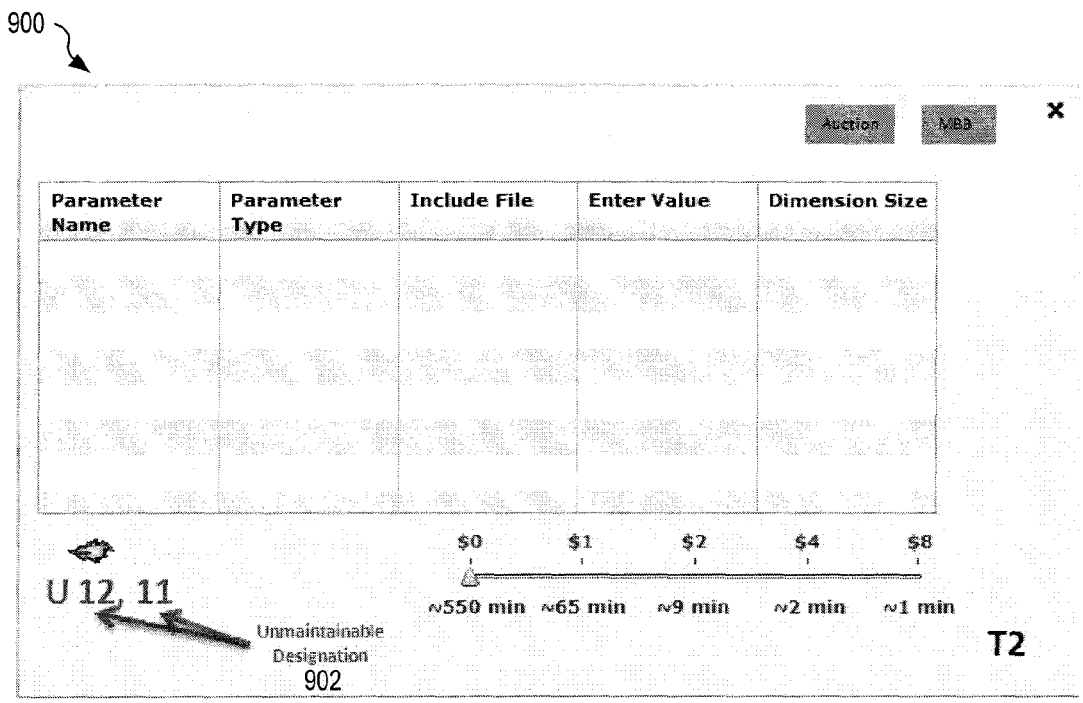
FIG. 9 is a screen shot showing one example of an unmaintainable design designation for a software design, in an embodiment.

FIG. 9 is a screen shot 900 showing one example of an unmaintainable design designation 902 for software design 110 of FIG. 1. Designs that are unmaintainable are given a designation of "Ux,y," where "x" is the number of decomposition levels and "y" is the average number of processes per subgraph. A design is designated maintainable using a designation of "Mx,y," where "x" is the number of decomposition levels and "y" is the average number of processes per subgraph.

Having a displayed designation (e.g., designation 902) regarding maintainability of each software application gives the software-purchasing community much-needed software-usability information prior to purchase.

Compact Design

Figure 10:
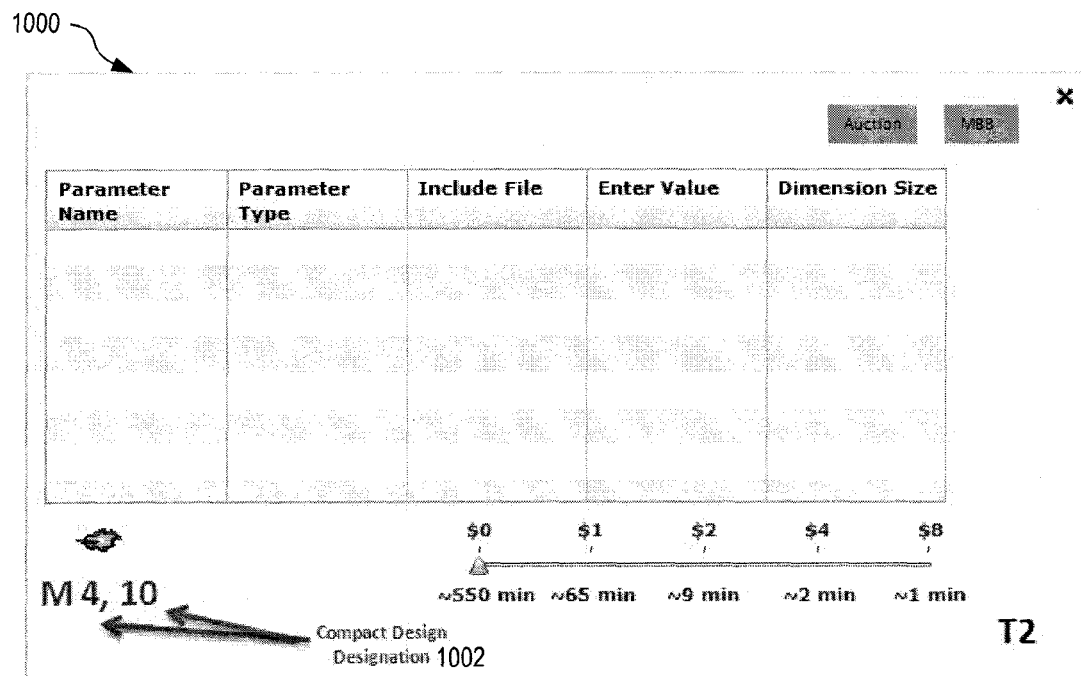
FIG. 10 is a screen shot showing one example of a compact design designation for a software design, in an embodiment.

FIG. 10 is a screen shot 1000 showing one example of a compact design designation 1002 for a software design that is compact. Specifically, there are four decomposition levels, and subgraphs on those four levels have an average of ten processes each.

Equation 1 is used to calculate the general design-complexity designation.

DESIGN COMPLEXITY CALCULATIONS     EQUATION 1

$$P = \sum_{a=1}^{M} \sum_{b=1}^{N_a} P(S_{a,b})$$

$$S = \sum_{x=1}^{M} G_x$$

$$y = P/S$$

Where: P=# of processes, S=# of subgraphs, P(z)=# processes of subgraph z, a=current decomposition level, b=current subgraph number of the current decomposition level, M=# of decomposition levels, $N_a$=# of subgraphs at decomposition level a, $G_x$=number of subgraphs at decomposition level x, and y=average # processes per subgraph.

Loose Design

Figures 11, 12:
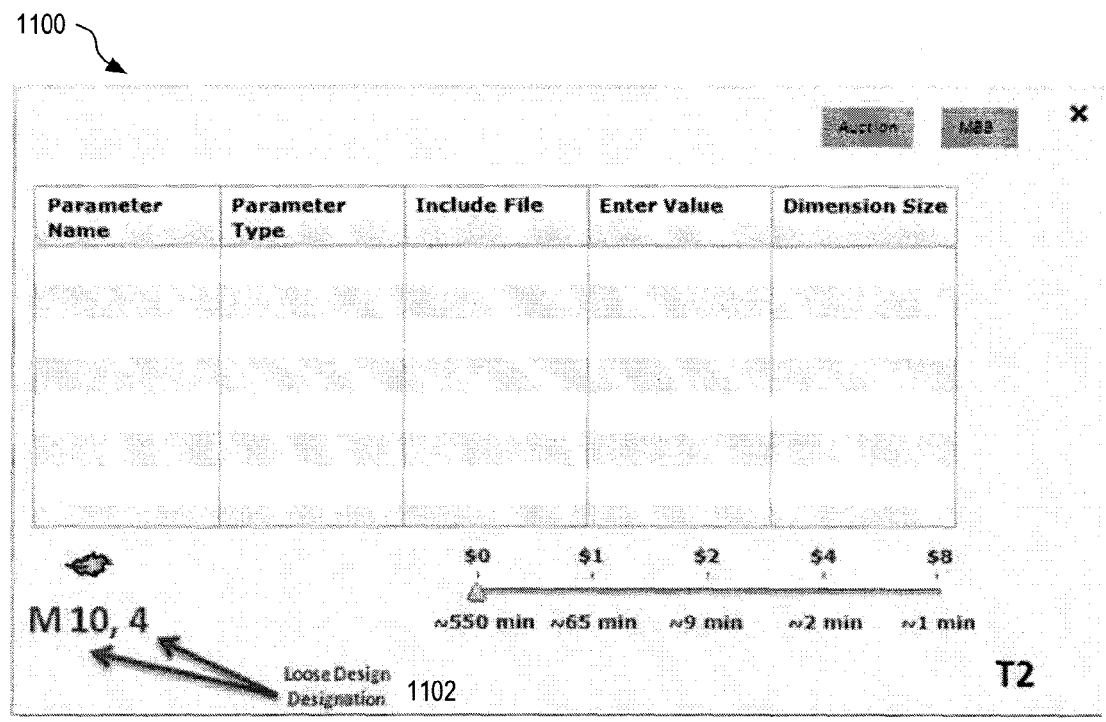
FIG. 11 is a screen shot showing one example of a loose-design designation for a software design, in an embodiment.
FIG. 12 is a table showing determination of the maximum number of processes possible for a balanced design.

FIG. 11 is a screen shot 1100 showing one example of a loose-design designation 1102 for a design that is loose. Note that the general design complexity calculation shown in Equation 1 is also used here. Specifically, this design has ten decomposition levels and an average of four processes within each subgraph. The "M" within designation 1102 indicates that the design is maintainable, however.

Balanced Design

Although both the compact and loose designs are maintainable, they still concentrate the complexity in certain parts of the design. Consider a software design that evenly spreads the complexity through the decomposition levels as well as through the subgraphs. Spreading the complexity through the decomposition levels either decreases the complexity at each level while increasing the number of levels or increases the complexity at each level while decreasing the number of levels. If the McCabe-like complexity for the number of decomposition levels is the same as at the number of subgraphs for each decomposition level, then the complexity is evenly represented throughout the design—that is, the software design is complexity-balanced. FIG. 12 is a table 1200 showing determination of the maximum number of processes possible for a balanced design.

This gives the following complexity equations:

BALANCED DESIGN     EQUATION 2
COMPLEXITY CALCULATIONS $$P = \sum_{w=0}^{M} M^w$$

-continued $$S = \sum_{w=1}^{M} M^{w-1}$$

$$y = P/S$$

Where: P=# of processes, S=# of subgraphs, y=average number processes per subgraph, and M=the McCabe-like complexity number=# of decomposition levels.

Note that the general design-complexity calculation may be used instead of the balanced design-complexity calculation.

Figure 13:
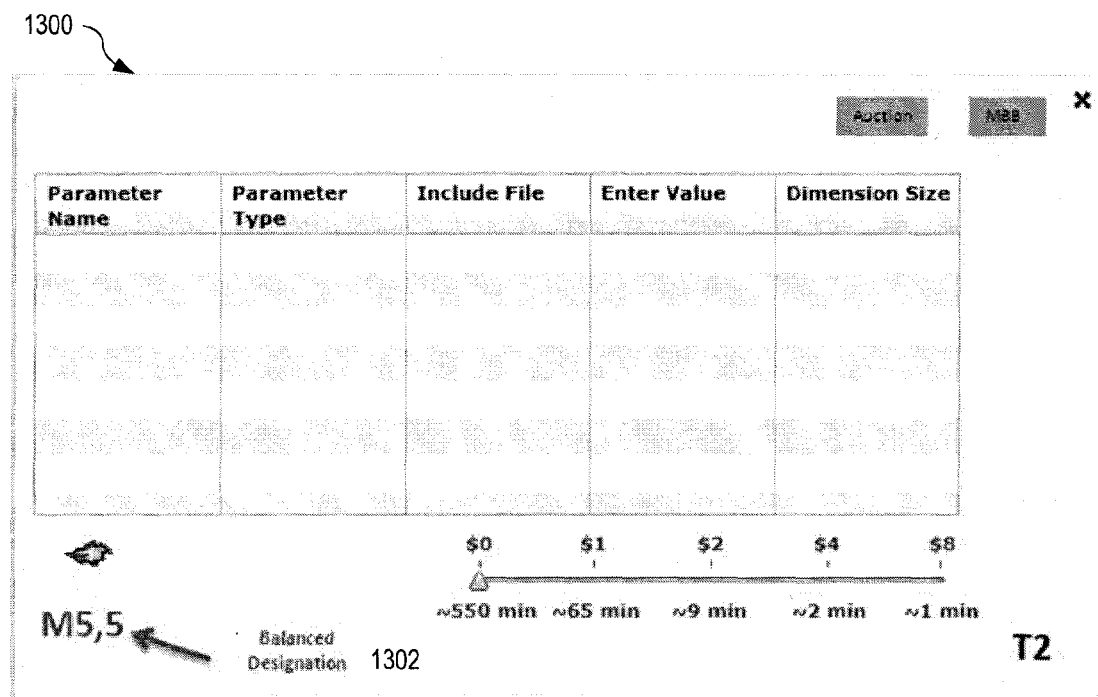
FIG. 13 is a screen shot showing one example of a balanced-design designation for a software design, in an embodiment.

FIG. 13 is a screen shot 1300 showing one example of a balanced-design designation 1302 for an application with a balanced-design.

Automatic Design Complexity Determination

When creating software design 110, the developer always starts with the context level then decomposes the processes from there. As discussed above, a subgraph (e.g., subgraph 304, FIG. 3) is created for each process that is decomposed. When a subgraph is created, subgraph count 144 for the design is increased. The developer then places processes in the new subgraph. Design editor 120 may save the number of processes per subgraph as they are created or deleted from that subgraph. Each time the developer decomposes a process into a subgraph, the decomposition level of the new subgraph is saved as well as a maximum number of levels. When a subgraph is deleted, design editor 120 decreases subgraph count 144 by one and, for the decomposition level of the just-deleted subgraph, determines if there are any other subgraphs at that decomposition level. If there are no other subgraphs at that decomposition level, the decomposition level count 142 is decreased by one. Thus, in one embodiment, the number of subgraphs, number of processes per subgraph, and the number of decomposition levels are known for software design 110 and the general design complexity designation equation (Equation 1) may be used to calculate the complexity designation for the current design.

CONCLUSION

The McCabe complexity methods are extended to decomposition graphs and hierarchical finite state machines. This extended capability not only shows the complexity of a design (a 2-tuple designating number of decomposition levels and the maximum number of processes in a subgraph, but also categorizes design type as: Unmaintainable, Compact, Loose, or Balanced. In addition, the limits to maintainable application designs are given. Finally, the complexity, type and design limits are automatically computable from the design itself.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A method for determining and displaying a complexity designation of a software design based upon a hierarchical functional decomposition design model, comprising:
    determining, within a development server, a number of decomposition levels in the software design, the software design including a plurality of decomposition levels, at least one of the decomposition levels having a subgraph, each subgraph having a minimum of two processes;
    determining a number of processes in each subgraph of the software design; and
    determining the complexity designation for the software design based upon a complexity model, a maximum maintainable complexity number, the number of decomposition levels and the number of processes in each of the subgraphs;
    wherein the complexity designation indicates (a) unmaintainable when the number of decomposition levels exceeds the maximum maintainable complexity number, or when the number of processes on any one of the subgraphs exceeds the maximum maintainable complexity number, and (b) maintainable when the number of decomposition levels does not exceed the maximum maintainable complexity number and when none of the numbers of processes for each subgraph exceeds the maximum maintainable complexity number; and
    displaying the complexity designation within a visual representation of the software design.

2. The method of claim 1, further comprising:
    determining, based upon the number of decomposition levels, the number of subgraphs, and the number of processes, a design type of the software design, the design type indicating one of: Unmaintainable Design, Compact Design, Loose Design, and Balanced Design.

3. The method of claim 1, the complexity model being a McCabe cyclomatic complexity model.

4. The method of claim 1, further comprising automatically updating the complexity designation by:
    tracking adding and removing of the decomposition levels in the software design during editing of the software design; and
    repeating the step of determining the cyclomatic complexity when one or more decomposition levels are added or removed from the software design.

5. The method of claim 1, further comprising automatically updating the complexity designation by:
    tracking adding and removing of the subgraphs in the software design during editing of the software design; and
    repeating the step of determining the cyclomatic complexity when one or more subgraphs are added or removed from the software design.

6. The method of claim 1, the step of displaying comprising representing the complexity designation, within the visual representation, as one of a letter M and a letter U followed by a tuple, wherein the letter M indicated that the software design is maintainable, the letter U indicates that the software design is unmaintainable, the first number of the tuple defines the number of decomposition levels in the software design, and the second number of the tuple defines the average number of processes in a subgraph of the software design.

7. The method of claim 1, further comprising automatically updating the complexity designation by:
    tracking adding and removing of the processes in the software design during creation and editing of the software design; and
    repeating the step of determining the cyclomatic complexity when one or more processes are added or removed from the software design.

8. A software product comprising instructions, stored on non-transitory computer-readable media, wherein the instructions, when executed by a computer, perform steps for determining and displaying a complexity designation of a software design based upon a hierarchical functional decomposition design model, comprising:

instructions for determining, within a development server, a number of decomposition levels in the software design, the software design including a plurality of decomposition levels, at least one of the decomposition levels having a subgraph, each subgraph having a minimum of two processes;

instructions for determining a number of processes in each subgraph of the software design; and instructions for determining the complexity designation for the software design based upon a complexity model, a maximum maintainable complexity number, the number of decomposition levels and the number of processes in each of the subgraphs;

wherein the complexity designation indicates a unmaintainable when the number of decomposition levels exceeds the maximum maintainable complexity number, or when the number of processes on any one of the subgraphs exceeds the maximum maintainable complexity number, and (b) maintainable when the number of decomposition levels does not exceed the maximum maintainable complexity number and when none of the numbers of processes for each subgraph exceeds the maximum maintainable complexity number; and instructions for displaying the complexity designation within a visual representation of the software design.

9. A system for determining and displaying design complexity of a software design, comprising:

a development server having a processor and a memory, wherein the memory stores machine readable instructions that when executed by the processor perform the steps of:

determining, within a development server, a number of decomposition levels in the software design, the software design including a plurality of decomposition levels, at least one of the decomposition levels having a subgraph, each subgraph having a minimum of two processes;

determining a number of processes in each subgraph of the software design; and determining the complexity designation for the software design based upon a complexity model, a maximum maintainable complexity number, the number of decomposition levels and the number of processes in each of the subgraphs;

wherein the complexity designation indicates (a) unmaintainable when the number of decomposition levels exceeds the maximum maintainable complexity number, or when the number of processes on any one of the subgraphs exceeds the maximum maintainable complexity number, and (b) maintainable when the number of decomposition levels does not exceed the maximum maintainable complexity number and when none of the numbers of processes for each subgraph exceeds the maximum maintainable complexity number; and displaying the complexity designation within a visual representation of the software design.

10. The method of claim 1, the maximum maintainable complexity number being ten.

11. The method of claim 3, the maximum maintainable complexity number being ten.

12. The software product of claim 8, further comprising instructions for determining, based upon the number of decomposition levels, the number of subgraphs, and the number of processes, a design type of the software design, the design type indicating one of: Unmaintainable Design, Compact Design, Loose Design, and Balanced Design.

13. The software product of claim 8, the complexity model being a McCabe cyclomatic complexity model.

14. The software product of claim 13, the maximum maintainable complexity number being ten.

15. The software product of claim 8, the maximum maintainable complexity number being ten.

16. The software product of claim 8, further comprising automatically updating the complexity designation by:

tracking adding and removing of one or more of the decomposition levels, the subgraphs, and the processes in the software design during creation and editing of the software design; and repeating the step of determining the cyclomatic complexity when one or more decomposition levels, subgraphs or processes are added or removed from the software design.

17. The software product of claim 8, further comprising instructions for determining, based upon the number of decomposition levels, the number of subgraphs, and the number of processes, a design type of the software design, the design type indicating one of: Unmaintainable Design, Compact Design, Loose Design, and Balanced Design.

18. The system of claim 9, the complexity model being a McCabe cyclomatic complexity model, the maximum maintainable complexity number being ten.

19. The system of claim 9, the maximum maintainable complexity number being ten.

20. The system of claim 9, further comprising automatically updating the complexity designation by:

tracking adding and removing of one or more of the decomposition levels, the subgraphs, and the processes in the software design during creation and editing of the software design; and repeating the step of determining the cyclomatic complexity when one or more decomposition levels, subgraphs or processes are added or removed from the software design.

\* \* \* \* \*